(12) United States Patent
Gutt et al.

(10) Patent No.: US 8,370,329 B2
(45) Date of Patent: Feb. 5, 2013

(54) AUTOMATIC SEARCH QUERY SUGGESTIONS WITH SEARCH RESULT SUGGESTIONS FROM USER HISTORY

(75) Inventors: Zachary Mark Gutt, Seattle, WA (US); Richard Leigh Mains, Seattle, WA (US); Anastasia Paushkina, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 739 days.

(21) Appl. No.: 12/235,408

(22) Filed: Sep. 22, 2008

(65) Prior Publication Data

US 2010/0082604 A1    Apr. 1, 2010

(51) Int. Cl.
*G06F 17/30*    (2006.01)
(52) U.S. Cl. ........................................ 707/721
(58) Field of Classification Search .................. 707/706, 707/721
See application file for complete search history.

(56) References Cited

U.S. PATENT DOCUMENTS

| | | | |
|---|---|---|---|
| 5,724,457 A | 3/1998 | Fukushima | |
| 5,845,300 A | 12/1998 | Comer et al. | |
| 6,009,459 A | 12/1999 | Belfiore et al. | |
| 6,347,312 B1 | 2/2002 | Byrne et al. | |
| 6,377,965 B1 | 4/2002 | Hachamovitch et al. | |
| 6,408,294 B1 | 6/2002 | Getchius et al. | |
| 6,421,675 B1 | 7/2002 | Ryan et al. | |
| 6,564,213 B1 * | 5/2003 | Ortega et al. | 1/1 |
| 6,629,132 B1 | 9/2003 | Ganguly et al. | |
| 6,633,874 B1 | 10/2003 | Nusbickel | |
| 6,704,727 B1 | 3/2004 | Kravets | |
| 6,751,603 B1 | 6/2004 | Bauer et al. | |
| 6,772,150 B1 | 8/2004 | Whitman et al. | |
| 6,823,514 B1 | 11/2004 | Degenaro et al. | |
| 6,829,607 B1 | 12/2004 | Tafoya et al. | |
| 6,859,908 B1 | 2/2005 | Clapper | |
| 6,862,713 B1 | 3/2005 | Kraft | |
| 7,058,944 B1 | 6/2006 | Sponheim | |
| 7,089,228 B2 | 8/2006 | Arnold et al. | |
| 7,177,818 B2 | 2/2007 | Nair | |
| 7,181,444 B2 | 2/2007 | Porter | |
| 7,216,292 B1 | 5/2007 | Snapper et al. | |
| 7,296,016 B1 | 11/2007 | Farach-Colton | |
| 7,305,390 B2 | 12/2007 | Bowman | |
| 7,346,839 B2 | 3/2008 | Acharya | |
| 7,424,510 B2 | 9/2008 | Gross et al. | |

(Continued)

OTHER PUBLICATIONS

A. Komlodi et al., Search history support for finding and using information, Information Processing and Management 43 (2007) 10-29.*

(Continued)

*Primary Examiner* — William Spieler
(74) *Attorney, Agent, or Firm* — Shook Hardy & Bacon LLP

(57) ABSTRACT

Suggested search results are provided with suggested search queries as a user incrementally enters characters of a search query. At each incremental user input, a query portion is received and suggested search queries are identified based on the query portion. Suggested search results associated with the suggested search queries are also identified. These suggested search results enable direct navigation to web sites associated with the search results. In some embodiments, a user's search history is analyzed to identify search results selected by the user for the suggested search queries. In other embodiments, search histories for a group of users associated with the user are analyzed to identify the suggested search results to provide with the suggested search queries.

16 Claims, 7 Drawing Sheets

U.S. PATENT DOCUMENTS

| | | | |
|---|---|---|---|
| 7,467,131 | B1 | 12/2008 | Gharachorloo et al. |
| 7,487,145 | B1 | 2/2009 | Gibbs et al. |
| 7,526,481 | B1 | 4/2009 | Cusson et al. |
| 7,610,194 | B2 | 10/2009 | Bradford et al. |
| 7,752,326 | B2 | 7/2010 | Smit |
| 7,836,044 | B2 | 11/2010 | Kamvar et al. |
| 7,840,557 | B1 | 11/2010 | Smith et al. |
| 7,953,730 | B1* | 5/2011 | Bleckner et al. ............. 707/722 |
| 8,005,919 | B2 | 8/2011 | Mehanna et al. |
| 2005/0076003 | A1* | 4/2005 | DuBose et al. ................... 707/1 |
| 2006/0206454 | A1 | 9/2006 | Forstall |
| 2006/0259479 | A1 | 11/2006 | Dai |
| 2007/0162422 | A1 | 7/2007 | Djabarov |
| 2007/0203906 | A1 | 8/2007 | Cone |
| 2008/0104042 | A1 | 5/2008 | Gutt |
| 2008/0109401 | A1 | 5/2008 | Sareen |
| 2008/0168032 | A1 | 7/2008 | Criou |
| 2008/0215623 | A1* | 9/2008 | Ramer et al. ............... 707/104.1 |

OTHER PUBLICATIONS

Aula et al., Information Search and Re-access Strategies of Experienced Web Users, WWW 2005, May 10-14, 2005.*

Mozilla Development Center, http://developer.mozilla.org/en/docs/Supporting_search_suggestions_in_search_plugins, Aug. 1, 2008.

Search and Analysis Guide, https://system.netsuite.com/help/helpcenter/en_US/PDF/Search.pdf, May 15, 2008.

Search with Autosuggest Feature, http://woork.blogspot.com/2008/02/search-with-autosuggest-feature.html, Aug. 1, 2008.

Ajax Auto Suggest Search Box, http://www.aspectsearch.com/features/auto-suggest-search.aspx, Aug. 1, 2008.

Suggestion—Ajax Patterns, http://ajaxpatterns.org/Suggestion#Live_Search, Aug. 1, 2008.

Creating an Autosuggest Textbox with JavaScript, Part 1, http://www.webreference.com/programming/javascript/ncz, Aug. 1, 2008.

Ajax Autosuggest/Autocomplete from Database, http://www.roscripts.com/Ajax_autosuggest_autocomplete_from_database-154.html, Aug. 1, 2008.

Autocomplete Feature of IE, http://www.geocities.com/technofundo/tech/web/ie_autocomplete.html, Aug. 4, 2008.

User:Dria/On Tagging, http://wiki.mozilla.org/User:Dria/On_Tagging, Aug. 4, 2008.

Stolen History, http://sourceforge.net/projects/stolenhistory/, Aug. 4, 2008.

Features, http://www.cuil.com/info/features/, Aug. 4, 2008.

Indexes of/pub.mozilla.org/mozilla/releases/mozilla0.9.1, http://ftp.mozilla.org/pub/mozilla/releases/mozilla0.9.1/ [Oct. 27, 2011 8:40:36AM].

Shi, Rong, et al., Interoperable Federated Digital Library using XML and LDAP, May 2001.

Weltman, Rob, et al., LDAP Programming with Java, 2000, pp. 1-100, part 1.

Mozilla 0.9.1 Release Notes, http://www-archive.mozilla.org/releases/mozilla0.9.1[Oct. 27, 2011 8:40:07 AM].

.NET Development, http://msdn.microsoft.com/en-us/library/ff361664(v=VS.110).aspx[Oct. 25, 2011 5:16:11 PM].

Netscape Communicator for Solaris 4.7 Release Notes, Updated Aug. 20, 1999.

Overview of the .NET Framework, .NET Framework 1.1, http://msdn.microsoft.com/en-us/library/zw4w595w(v=VS.71).aspx[Oct. 25, 2011 4:51:31 PM].

Clinick, Andrew, Remote Scripting, Apr. 12, 1999.

Pedersen, Lima, The Paraphrase Search Assistant: Terminology Feedback for interactive Information Seeking, Preceeding of 22nd International Conference on Research and Retrieval in Information, 1999; digir-99: 245-152 [153-59].

Non Final Office Action in U.S. Appl. No. 12/235,413, mailed Jul. 27, 2011.

Using Visual Studio 6.0 to Access SQL Server 7.0, Visual Studio 6.0, Microsoft Corporation, Oct. 1998, http://msdn.microsoft.com/en-us/library/aa239562(v=VS.60).aspx[Oct. 25, 2011 4:18:55 PM].

What's New in the Visual Studio Enterprise Edition, Visual Studio 6.0, http://msdn.microsoft.com/en-us/library/aa266974(v-VS.60).aspx[Oct. 25, 2011 3:09:09 PM].

Weltman, Rob, et al., LDAP Programming with Java, 2000, pp. 101-200, part 2.

Weltman, Rob, et al., LDAP Programming with Java, 2000, pp. 201-300, part 3.

Weltman, Rob, et al., LDAP Programming with Java, 2000, pp. 301-400, part 4.

Weltman, Rob, et al., LDAP Programming with Java, 2000, pp. 401-500, part 5.

Weltman, Rob, et al., LDAP Programming with Java, 2000, pp. 501-600, part 6.

Weltman, Rob, et al., LDAP Programming with Java, 2000, pp. 601-701, part 7.

* cited by examiner

US 8,370,329 B2

AUTOMATIC SEARCH QUERY SUGGESTIONS WITH SEARCH RESULT SUGGESTIONS FROM USER HISTORY

BACKGROUND

The amount of digital information and content available on computing devices continues to grow exponentially. Given the vast amount of digital information, search engines and other search technologies have been developed to assist users in locating specific information and documents. For instance, many search engines allow users to search for documents and information available on the Internet or World Wide Web. Additionally, it is now common for individual websites and application programs to provide a search box so that users can run queries for content on that website or within that application. Similarly, desktop search techniques allow a user to search for information and documents stored on his or her computer.

Search engines typically provide an input box that allows users to enter search queries that include one or more terms that may be of interest to the users. After receiving a search query from a user, a search engine identifies documents and/or web pages that are relevant based on the terms and displays search results to the user. Because of its utility, web searching, that is, the process of finding relevant web pages and documents for user issued search queries has arguably become the most popular service on the Internet today.

Search engine providers have developed a variety of additional features to assist users in searching. For instance, many search engines provide query suggestion functionality in which a user, having entered a particular search query, is given a set of suggested search queries related to the user's search query. In some implementations, suggested search queries may be provided as the user types in their search query but before the user initiates a search. The user may select one of the suggested search queries causing a search to be performed using the selected suggested search query and search results to be returned to the user. Although suggested search queries have been found to be very useful to users, additional improvements could allow users to more quickly access documents and web pages the users are attempting to retrieve.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Embodiments of the present invention relate to providing suggested search queries and associated suggested search results incrementally as a user enters a search query. As a user enters each character of a search query, a query portion is received, and suggested search queries are identified based on the query portion. In embodiments, the suggested search queries include search queries previously submitted by the user as determined from search history information for the user. Additionally, search results previously visited by the user for those search query suggestions are identified as suggested search results. The suggested search queries and suggested search results are provided to the user. In further embodiments, instead of using the user's own search history to identify suggested search results associated with suggested search queries, search histories for a group of users associated with the user are employed.

BRIEF DESCRIPTION OF THE DRAWINGS

The present invention is described in detail below with reference to the attached drawing figures, wherein.

DETAILED DESCRIPTION

Figure 1:
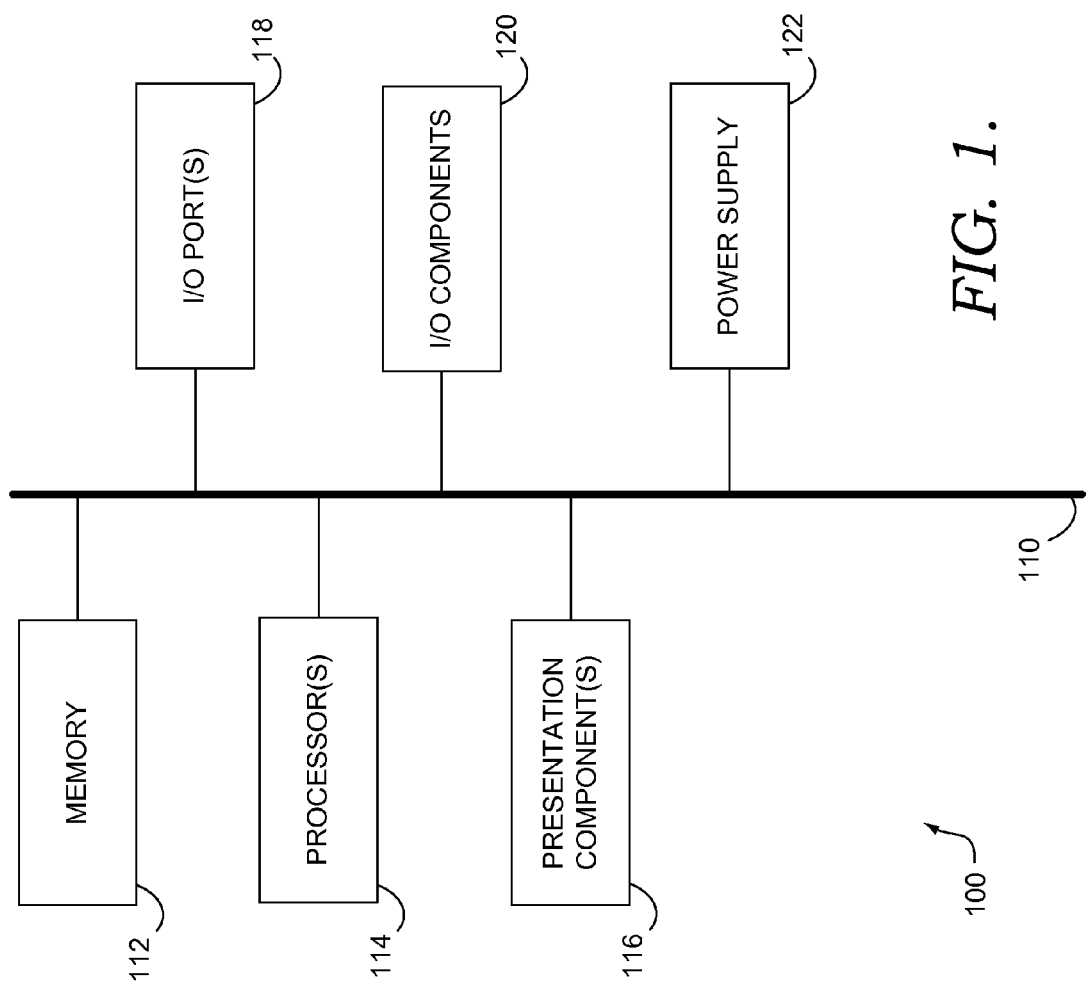
FIG. 1 is a block diagram of an exemplary computing environment suitable for use in implementing embodiments of the present invention.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Embodiments of the present invention are generally directed to providing suggested search queries and corresponding suggested search results to a user while the user is entering a search query but before the search query is completed and submitted by the user for a search to be performed. As a user incrementally enters each character of a search query, a portion of the search query is received. For instance, if the user intends to enter the search query "computer," the query portions received as the user types would include "c," "co," "com" "comp," "compu," "comput," "compute", and "computer." As each query portion is received, suggested search queries are determined for the query portion. As used herein, the term "suggested search query" refers to a search query that is selected based on a received query portion and provided to the user as a suggestion for performing a search. By way of example, if the user has typed "co," the suggested search queries may include, for instance, "coffee, "computer," "condo," "fair trade coffee," "incorporated," and "tea." In some instances, the suggested search queries include the string from the query portion (i.e., "co") at the beginning or middle of a term; while in other instances, the suggested search queries may be related concepts and terms that don't include the string (e.g., tea is related to coffee). By presenting suggested search queries as the user is entering the search query, the user does not need to complete entering the entire search query or the user may be presented with a search query the user prefers over what the user originally intended to enter. The user may select a suggested search query and cause a search to be performed using the selected search query.

In addition to providing suggested search queries while the user is entering a search query, embodiments of the present invention also provide one or more suggested search results corresponding with one or more of the suggested search queries. For instance, the most popular search result for a given suggested search query may be identified and provided as a suggested search result to the user with the suggested search query. By presenting suggested search results as the user is entering a search query, the user does not need to complete the search query or select a suggested search query and cause a search to be performed and then review the complete set of search results. Instead, the user may recognize that a suggested search result presented with a suggested search query as the user types corresponds with a web page the user is seeking. The user can select the suggested search result and navigate to the desired web page directly.

In some embodiments of the present invention, suggested search results corresponding with suggested search queries are identified by employing the search history for the user entering the current search query. In particular, the user's search history includes search queries the user has submitted in the past and the search results the user has selected for those search queries. When a query portion is received, search queries previously submitted by the user are identified from the user's search history as suggested search queries. Additionally, the search results selected by the user for those previously submitted search queries are identified as suggested search results and associated with the corresponding suggested search queries. The suggested search queries and any corresponding suggested search results are then provided to the user.

In further embodiments of the present invention, suggested search results corresponding with suggested search queries are identified by employing the search history for a group of users having some affiliation with the user entering the search query. For instance, the group of users may be users within the same social network as the user entering the current search query. As another example, the group of users may be users located in the same geographical location as the user entering the search query. As still another example, the group of users may be users in the same age group as the user entering the search query. The group of users may be implicitly or explicitly identified.

The search history for each user in the group of users includes search queries that user has submitted in the past and the search results that user has selected for those search queries. When a given user is interacting with a search engine, a group of users having an affiliation with that given user is identified. When a query portion is received as the given user enters a search query, suggested search queries are identified. Additionally, suggested search results are identified from the search history information for the group of users. In particular, the search history information is analyzed to identify search results previously selected by users in the group for the suggested search queries. The identified suggested search results are associated with corresponding suggested search queries. The suggested search queries and any corresponding suggested search results are then provided to the user entering the search query.

Accordingly, in one aspect, an embodiment of the present invention is directed to a computer-implemented method for providing suggested search queries and associated search results to a user. The method includes receiving user input representing a search query portion, the user input being received prior to receiving a user command to perform a search using a completed search query. The method also includes identifying suggested search queries based on the search query portion. The method further includes identifying a search result corresponding with a suggested search query, the search result having been previously selected by the user in a previous search session. The method still further includes communicating the suggested search queries and the search result for presentation to the user.

In another embodiment, as aspect of the invention is directed to one or more computer-storage media storing computer-useable instructions for causing a computing device to perform a method for providing suggested search queries and suggested search results. The method steps are performed incrementally as a user incrementally enters characters to form a portion of a search query. The method includes receiving the portion of the search query. The method also includes accessing search history information for the user, the search history information including previous search queries submitted by the user and search results selected by the user for each of the previous search queries. The method further includes identifying a suggested search query based on the portion of the search query and the search history information for the user, the suggested search query corresponding with a search query previously submitted by the user. The method also includes identifying a suggested search result based on the suggested search query and the search history information for the user, the suggested search result corresponding with a search result previously selected by the user for the search query previously submitted by the user, wherein the search result has been previously selected by the user at least a predetermined minimum number of times. The method still further includes communicating the suggested search query and the suggested search result for presentation to the user, wherein the suggested search result is presented in association with the suggested search query.

A further embodiment is directed to one or more computer-storage media storing computer-useable instructions for causing a computing device to perform a method for providing suggested search queries and associated search results. The method includes receiving user input from the first user, the user input representing a search query portion, wherein the user input is received prior to receiving a user command to perform a search using a completed search query. The method also includes identifying suggested search queries based on the search query portion. The method further includes identifying a search result corresponding with a suggested search query, the search result having been previously selected in a previous search session by a second user within a group of users associated with the first user. The method still further includes communicating the one or more suggested search queries and the at least one search result for presentation to the first user.

Having briefly described an overview of embodiments of the present invention, an exemplary operating environment in which embodiments of the present invention may be implemented is described below in order to provide a general context for various aspects of the present invention. Referring initially to FIG. 1 in particular, an exemplary operating environment for implementing embodiments of the present invention is shown and designated generally as computing device 100. Computing device 100 is but one example of a suitable computing environment and is not intended to suggest any limitation as to the scope of use or functionality of the invention. Neither should the computing device 100 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 1, computing device 100 includes a bus 110 that directly or indirectly couples the following devices: memory 112, one or more processors 114, one or more presentation components 116, input/output ports 118, input/output components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. We recognize that such is the nature of the art, and reiterate that the diagram of FIG. 1 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 1 and reference to "computing device."

Computing device 100 typically includes a variety of computer-readable media. Computer-readable media can be any available media that can be accessed by computing device 100 and includes both volatile and nonvolatile media, removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 100. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 112 includes computer-storage media in the form of volatile and/or nonvolatile memory. The memory may be removable, nonremovable, or a combination thereof. Exemplary hardware devices include solid-state memory, hard drives, optical-disc drives, etc. Computing device 100 includes one or more processors that read data from various entities such as memory 112 or I/O components 120. Presentation component(s) 116 present data indications to a user or other device. Exemplary presentation components include a display device, speaker, printing component, vibrating component, etc.

I/O ports 118 allow computing device 100 to be logically coupled to other devices including I/O components 120, some of which may be built in. Illustrative components include a microphone, joystick, game pad, satellite dish, scanner, printer, wireless device, etc.

Figure 2:
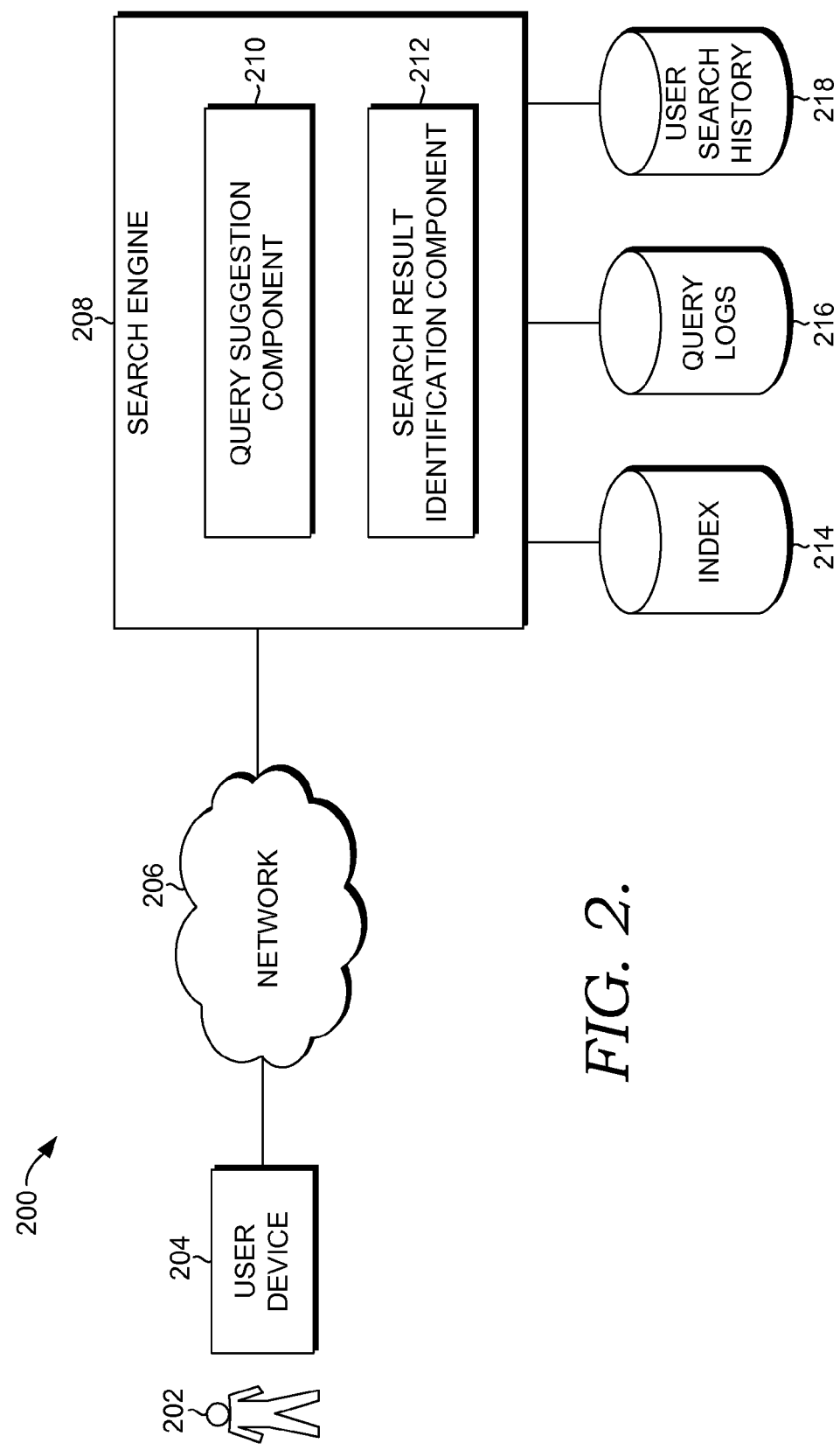
FIG. 2 is a block diagram of an exemplary system in which embodiments of the invention may be employed in which suggested search results are identified for suggested search queries based on a user's search history stored server-side.

Referring now to FIG. 2, a block diagram is provided illustrating an exemplary system 200 in which embodiments of the present invention may be employed. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

Among other components not shown, the system 200 generally includes a user device 204 and a search engine 208. The user device 204 and search engine 208 may each include any type of computing device, such as computing device 100 described with reference to FIG. 1, for example. The components of the system 200 may communicate with each other via a network 206, which may include, without limitation, one or more local area networks (LANs) and/or wide area networks (WANs). Such networking environments are commonplace in offices, enterprise-wide computer networks, intranets, and the Internet. It should be understood that any number of user devices, search engines, and networks may be employed within the system 200 within the scope of the present invention. Each may comprise a single device or multiple devices cooperating in a distributed environment. For instance, the search engine 208 may comprise multiple devices arranged in a distributed environment that collectively provide the functionality of the search engine 208 described herein. Additionally, other components not shown may also be included within the system 200.

Generally, the system 200 illustrates an environment in which a user 202 may employ a user device 204 to issue search queries via the network 206 to the search engine 208, which returns search results based on the user's search query. As known in the art, the search engine 208 may generally include a crawler (not shown) for crawling web pages and other documents and indexing information in an index 214. By indexing information from web pages and other documents, the search engine 208 may provide search capabilities to users, such as the user 202. In particular, the user 202 may employ a web browser or other mechanism on the user device 204 to communicate with the search engine 208. For instance, the user 202 may issue a search query to the search engine 208 and receive search results.

In the embodiment illustrated in FIG. 2, the search engine 208 includes a query suggestion component 210 that is configured to provide search suggestions to the user 202 as the user 202 incrementally enters a search query employing the user device 204. In some embodiments, the search engine 208 incrementally receives portions of a search query as a user 202 enters each character. A new search query portion may be received after each keystroke or other input by the user. For instance, suppose the user 202 wishes to enter the search query "coffee." The portions received by the search engine 208 as the user 202 types each character would include "c," "co," "cof," "coff," "coffe," and "coffee." As such, the term "portion" is used herein to include a 100 percent, completed search query, as well as any percentage of a completed search query under 100 percent (i.e., an incomplete search query). In some embodiments, time-based approaches may be employed to provide query portions to the search engine 208. For instance, the search engine 208 may continuously receive a query portion each time a predetermined period of time lapses, whether or not the query portion has changed during that time period. In other embodiments, the query portion may be analyzed at predetermined time intervals for changes and each time a change is identified, the search engine 208 receives the new query portion. Any and all such variations are contemplated to be within the scope of embodiments of the present invention.

As each portion of the search query is incrementally received while the user 202 is entering the search query, the query suggestion component 210 identifies suggested search queries that may be provided to the user 202. Generally, the query suggestion component 210 may attempt to determine what search query the user 202 intends to submit before the user 202 actually completes entering the search query and submits the completed search query. Additionally, the query suggestion component 210 may attempt to suggest search queries related to what the user is entering as the user may prefer to user a different search query over what the user originally intended to enter. Continuing the example above in which the user 202 intends to enter the search query "coffee," after the user 202 has entered the query portion "co," the query suggestion component 210 identifies suggested search queries, which may include, for instance, "coffee, "computer," "condo," "fair trade coffee," "incorporated," and "tea."

The query suggestion component 210 may identify suggested search queries for a query portion in a variety of different manners within the scope of embodiments of the present invention. For instance, in some embodiments, the query suggestion component 210 may access query logs 216 which include information regarding past search queries submitted by users to the search engine. In such embodiments, the query suggestion component 210 compares the query portion with previously submitted queries in the query logs to identify suggested search queries for the query portion. In some embodiments, the query suggestion component 210 may leverage the information stored in the index 214 or information in the user search history 218 to generate suggested search queries for the query portion. In some embodiments, the query suggestion component 210 employs information in the user search history 218 to identify search queries previously submitted by the user 202 as suggested search queries. Any and all such variations are contemplated to be within the scope of embodiments of the present invention.

In embodiments, the submitted query portion may produce suggested search queries that begin with the same characters as the query portion. For example, if the user 202 types in "co" in a search box, a list containing "computers," "coffee," and "condos" may be suggested. In some embodiments, the submitted query portion may produce a list of suggested search queries that begin with different characters. For example, if a user types in "windows" in a search box, a list containing "Microsoft Windows" and "Anderson Windows" may be suggested. In further embodiments, the search query portion may result in suggested search queries that don't include characters from the query portion but are determined to be relevant. For instance, "tea" may be provided as a suggested search query when the query portion "co" is received since "tea" is related to "coffee."

In an embodiment, the query suggestion component 210 may determine a ranked order for the suggested search queries. The ranked order can be used to determine the most relevant suggested search queries that are related to the query portion. A variety of algorithms may be employed for determining the ranked order of suggested search queries in embodiments of the invention. The ranked order can be based on, for example, popularity. In an embodiment, popularity can be determined by the frequency with which users have submitted a completed search query, wherein the greater the frequency, the more popular the search query is judged to be. For example, for the submitted portion of a search query such as "com," if the term "computer" is more popular (has a greater frequency of usage) than the term "comedy," then "computer" will be ranked higher than "comedy." In another embodiment, the suggested search queries may be ranked alphabetically. In an embodiment, the query suggestion component 210 can be configured to identify any number of suggested search queries as determined by the ranked order. For example, the query suggestion component 210 can identify the top ten suggested search queries and return only those top ten suggested search queries to the user 202 for consideration and possible selection by the user 202. In some embodiments, suggested search queries identified from the user's personal search history (e.g., search queries the user 202 has submitted in the past) may be presented separately from suggested search queries identified from other sources (e.g., search queries from other users). In other embodiments, suggested search queries from the user's personal search history are ranked with other suggested search queries such that all the suggested search queries are comingled in a common list.

In addition to the query suggestion component 210 that provides suggested search queries, the search engine 208 also includes a search result identification component 212, which is configured to identify search results the user 202 has selected in previous search sessions for search queries matching the suggested search queries. Search results previously selected by the user 202 are typically referred to as "clickthroughs." To facilitate this process, a user search history data store 218 is provided to store information regarding the search history for the user 202. In embodiments, the search engine 208 may store search history information for a large number of users and may identify each user and each user's search history using some unique identifier for the user.

Accordingly, the search result identification component 212 may identify the present user and identify the present user's search history information.

Among other information, the user's search history includes search queries previously submitted by the user 202 to the search engine 208, as well as search results that the user 202 has selected for each search query. Other information that may be stored in the user's search history, by way of example only and not limitation, includes date and time of searches, location where a search is initiated by the user 202, and how long the user 202 viewed a web page associated with a search result.

For each suggested search query that is identified by the query suggestion component 210 from the user's personal search history (i.e., search query previously submitted by the user 202), the search result identification component 212 identifies, from the user' search history, search results selected by the user 202 for that suggested search query. Those search results are associated with the suggested search query as suggested search results, and the user 202 is provided with the suggested search results in conjunction with the corresponding suggested search query.

In some instances, there may be only a single search result previously selected by the user 202 for a given suggested search query and that search result is provided as a suggested search result. In other instances, there may be multiple search results that have been previously selected by the user 202 for a given suggested search query. In some embodiments, the search results may be ranked based on a variety of factors, including but not limited to, the number of times the user 202 has selected each search result, how recently the user 202 has selected each search result, and how long the user 202 viewed a web page associated with each search result. In some embodiments, only the top-ranked search result is provided to the user 202 as a suggested search result, while in other embodiments, multiple search results are provided in ranked order to the user 202 as suggested search results.

In some embodiments of the present invention, a search result is provided to the user 202 with a search suggestion only if the search result meets a predetermined threshold. By using a predetermined threshold, the search engine 208 may attempt to provide only those search results that the user is likely to wish to select again. The predetermined threshold may be based on one or more of a variety of different factors within various embodiments of the present invention. For instance, the threshold may be based on the number of times the user 202 has selected the search result, how recently the user 202 has selected the search result, and how long the user 202 viewed a web page associated with the search result.

Some users repeatedly enter the same search query to access the same search result and ultimately the same web page. As such, in some embodiments, the search engine 208 is configured to attempt to identify when the user 202 exhibits such behavior and provide suggested search results with suggested search queries only when the search results correspond with such user behavior. In such embodiments, the search result identification component 212 identifies a search result as a suggested search result for a given suggested search query only if the search result has been selected by the user 202 at least a predetermined minimum number of times. More particularly, a threshold number of selections is predetermined and a search result is presented with a suggested search query only if the number of times the search result has been selected by the user 202 crosses that threshold.

In some embodiments of the present invention, the search result identification component 212 may also identify suggested search results for presentation with suggested search queries using information from sources other than the user's personal search history. In other words, the search result identification component 212 may also identify search results that were not selected by the user 202 to provide as suggested search results with suggested search queries as the user is entering a search query. For instance, the search result identification component 212 may provide "popular" search results as suggested search results for a given search query by identifying search results most frequently selected by users in general for the given search query.

Figure 3:
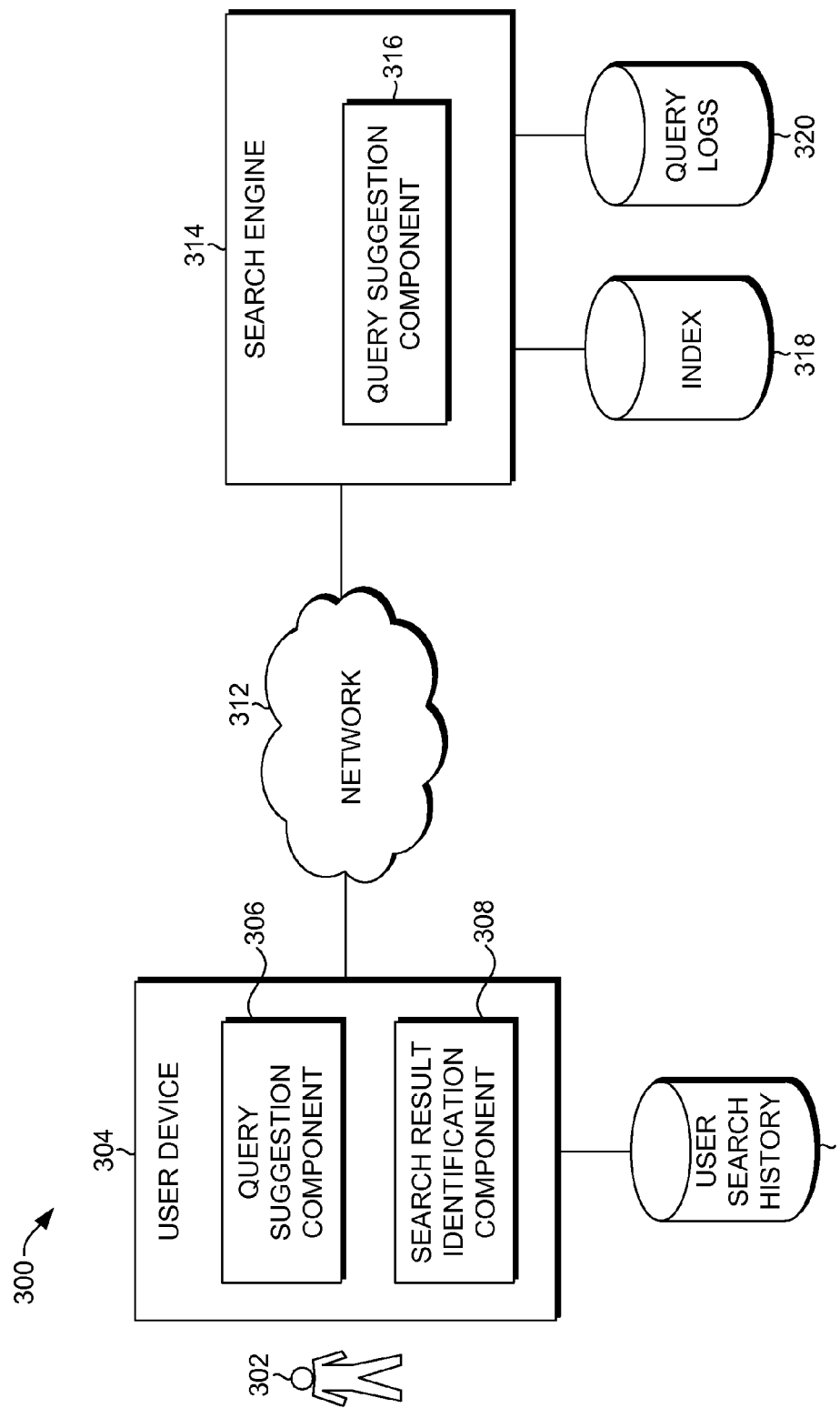
FIG. 3 is a block diagram of an exemplary system in which embodiments of the invention may be employed in which suggested search results are identified for suggested search queries based on a user's search history stored client-side.

FIG. 2 illustrates an embodiment in which suggested search queries and associated suggested search results are identified server-side (i.e., at the search engine 208) using user search history stored server-side. It should be understood, however, that embodiments of the invention are not limited to the specific implementation illustrated in FIG. 2. Instead, in various embodiments, suggested search queries and associated suggested search results may be identified client-side and/or server-side. For instance, FIG. 3 illustrates an embodiment of a system 300 in which user search history 310 is stored client-side at a user device 304 and suggested search results may be identified for suggested search queries at the user device 304. Again, the system 300 merely illustrates an additional embodiment and other embodiments beyond the systems 200 and 300 will become apparent to those skilled in the art and are within the scope of embodiments of the present invention as defined by the claims. For instance, although a search result identification component is not shown at the search engine 314 in FIG. 3, it should be understood that such a component may also be provided at the search engine 314 in some embodiments to generate suggested search results server-side in addition to suggested search results identified client-side by the search result identification component 308 on the user device 304.

In the embodiment illustrated in FIG. 3, a user 302 may generally employ the user device 304 to issue search queries to the search engine 314 via the network 312 similar to that discussed above with reference to FIG. 2. However, in the present embodiment, user search history 310 for the user 302 is stored at the user device 304. As the user 302 submits search queries to the search engine 314 and selects search results returned by the search engine 314, information including the submitted search queries and selected search results is stored in the user search history 310.

The user device 304 also includes a query suggestion component 306, which is similar to the query suggestion component 210 of FIG. 2. In particular, the query suggestion component 306 is configured to identify suggested search queries for query portions as the user 302 incrementally enters a search query. In an embodiment, suggested search queries are identified by comparing a query portion to search queries previously submitted by the user and identified in the user search history 310.

The user device 304 further includes a search result identification component 308, which is similar to the search result identification component 212 of FIG. 2. In particular, the search result identification component 308 is configured to identify, from the user search history 310, search results previously selected by the user 302 for the suggested search queries identified by the query suggestion component 306. Those search results may be provided as suggested search results with the suggested search queries.

In the embodiment of FIG. 3, the search engine 314 also includes a query suggestion component 316, which is similar to the query suggestion component 210 of FIG. 2. As such, in addition to identifying suggested search queries on the user device 304, suggested search queries may also be identified on the search engine 314. The query suggestion component 316 receives query portions from the user device 304 and compares the query portions to information in the index 318, query logs 320, or other source to identify suggested search queries. The suggested search queries are returned to the user device 304.

In some cases, it may be possible that a suggested search query from the search engine 314 corresponds with a previous search query in the user search history 310 that was not identified by the query suggestion component 306. Accordingly, in some embodiments, the suggested search queries from the search engine 314 are compared against previously submitted search queries in the user search history 310. If a suggested search query from the search engine 314 matches a previously submitted search query in the user search history 310 that was not selected by the query suggestion component 306, the search result identification component 308 identifies search results corresponding with that previously submitted search query. The search results may then be provided as suggested search results for the corresponding suggested search query.

The suggested search queries from the query suggestion component 306 and the query suggestion component 316 are presented to the user 302 with associated suggested search results. In another embodiment, the user device 304 may not include a query suggestion component 306 and only suggested search queries from the search engine 314 are employed. In other embodiments, the search engine 316 may not include the query suggestion component 316, and only suggested search queries from the user device 304 are employed. Additionally, as noted above, the search engine 316 may include a search result identification component for identifying suggested search results. Any and all such variations are contemplated to be within the scope of embodiments of the present invention.

Figure 4:
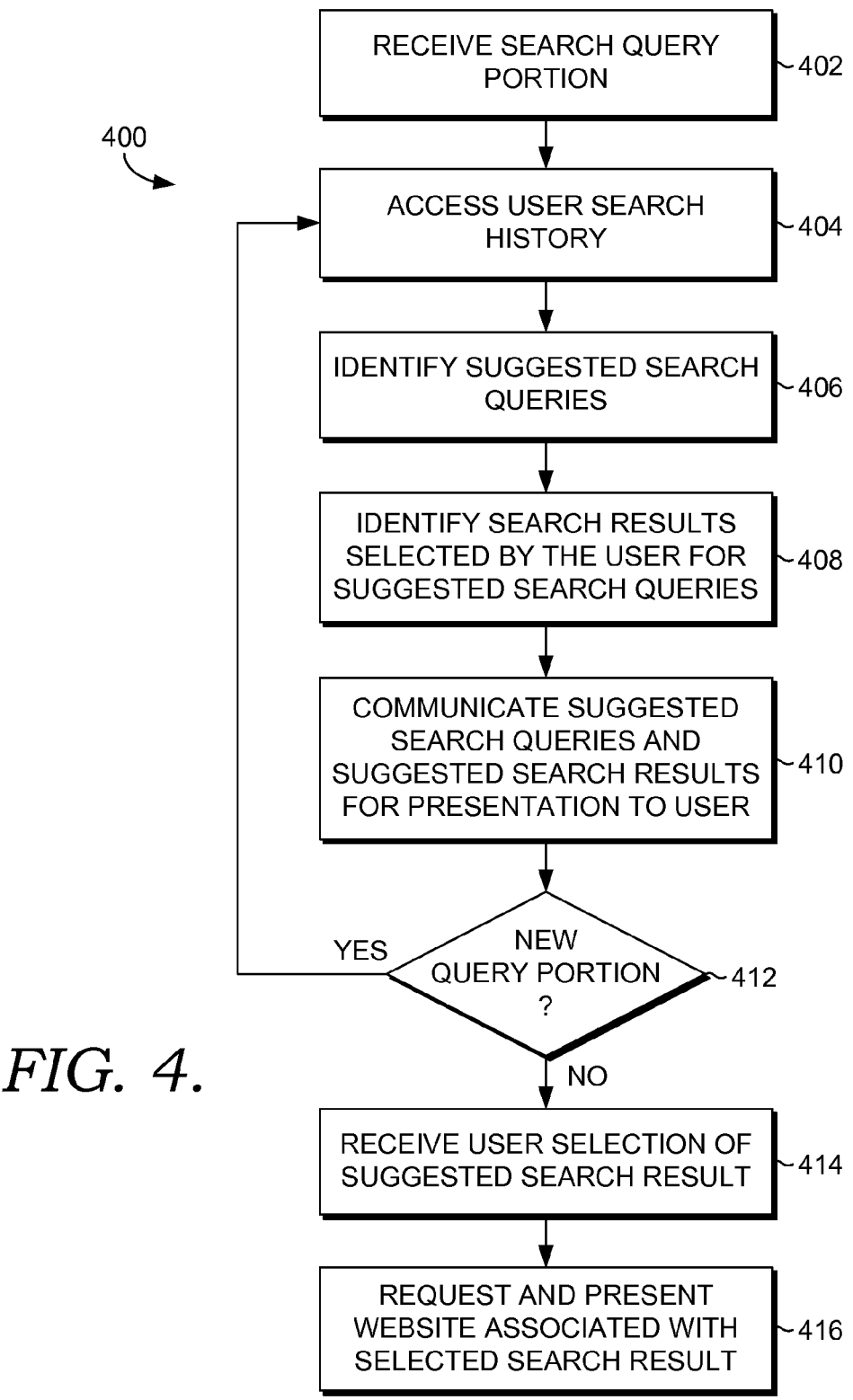
FIG. 4 is a flow diagram showing a method for identifying suggested search results for suggested search queries based on a user's search history in accordance with an embodiment of the present invention.

Turning now to FIG. 4, a flow diagram is provided illustrating a method 400 for providing suggested search results with suggested search queries based on user search history information in accordance with an embodiment of the present invention. As shown at block 402, a portion of a search query is initially received. For instance, if the user intended to enter the search query "computer," the initial query portion received would be "c."

As shown at block 404, a user's personal search history is accessed. The user's search history contains information including past search queries submitted by the user and search results that the user has selected for each search query. In some embodiments, to access the user's search history, the user is first identified, for instance, by requiring the user to log in, employing a cookie, or using some other mechanism for identifying the user. Identifying the user may or may not require the user to explicitly authenticate himself/herself to the system. After identifying the user, search history information corresponding with that user is identified. In some embodiments, such as when the user search history is maintained for a single user at the user device, accessing the user search history does not require any user identification.

Based on the received query portion, suggested search queries are identified, as shown at block 406. In embodiments, suggested search queries are identified by analyzing the user's search history to identify search queries previously submitted by the user to the search engine that are relevant to the query portion. In some embodiments, suggested search queries may be identified from other sources, such as the search engine index or query logs. For instance, the suggested search queries may be identified by comparing the search query portion to search queries in query logs and/or information contained in a search engine's index. Identification of suggested search queries for the search query portion may include ranking various suggested search queries such that only the highest ranked suggested search queries are returned to the user.

At block 408, suggested search results are identified as corresponding with at least one of the suggested search queries identified at block 406. In embodiments, the user's personal search history is analyzed to identify the suggested search results. The suggested search results are determined by identifying search results previously selected by the user for suggested search queries identified at block 406. The suggested search results are associated with the corresponding suggested search queries.

As discussed previously, in some embodiments, only search results meeting a predetermined threshold may be associated with the suggested search query and provided to the user as suggested search results. For instance, the predetermined threshold may be based on one or more of the following: the number of times the user has selected the search result, how recently the user has selected the search result, and how long a user viewed a web page associated with the search result. Additionally, if multiple search results are identified for a suggested search query, a ranking algorithm may be employed to select and/or order the search results as suggested search results. The ranking algorithm may include one or more of the following as factors: the number of times the user has selected the search result, how recently the user has selected the search result, and how long a user viewed a web page associated with the search result. In some embodiments, the method is directed to providing users with quick access to a web page that the user repeatedly accesses through searches. In such embodiments, the method identifies search results that users have selected in the past more frequently than a predetermined threshold and only these search results are provided as suggested search results.

As shown at block 410, the identified suggested search queries and associated suggested search results are communicated for presentation to the user. In some embodiments, the suggested search queries and associated suggested search results are identified on a server and communicated to the user's computer for presentation, for instance, on a display device. In other embodiments, the suggested search queries and associated suggested search results are identified on the user's computer and communicated to the display device for presentation.

In some embodiments, the suggested search results are presented adjacent to the suggested search queries with which they correspond such that the user can readily identify the correlation between a suggested search result and its associated suggested search query. For instance, a first suggested search result associated with a first suggested search query may be shown adjacent to the first suggested search query, while a second suggested search result associated with a second suggested search query is shown adjacent to the second suggested search query. In some embodiments, the suggested search queries and suggested search results are presented in a common user interface that allows for selection of one of the suggested search queries or suggested search results. For instance, the suggested search queries and suggested search results may be presented in a drop-down box adjacent to the input box in which the user is entering the user's search query.

Suggested search results may be displayed in any of a variety of different manners within the scope of embodiments of the present invention. Generally, the suggested search results may include links, previews of web pages, images, short answers, as well as a variety of additional information that may facilitate a user in identifying a suggested search result as a desired document. By way of example only and not limitation, in one embodiment, each suggested search result may include a reference to a website associated with the suggested search result. Such a reference may be, for example, a URL of the associated website. The suggested search result may also include a title of the suggested search result. As an example, after a user has typed "mi," the suggested search query "microsoft" may be presented to a user along with the suggested search result of "Microsoft Corporation, www.microsoft.com." In such an example, "Microsoft Corporation" would be the title and "www.microsoft.com" would be the URL reference associated with the suggested search result. As another example, a search result may correspond with an image, and the suggested search result may be displayed as a thumbnail of the image. In some embodiments, the suggested search result may include an embedded hyperlink that is selectable by the user.

As discussed previously, embodiments of the present invention operate to provide suggested search queries and suggested search results while the user is entering a search query but before the user actually submits a completed search query. For instance, each time a user edits the query portion, suggested search queries and suggested search results may be provided. Accordingly, a determination is made at block 412 as to whether the portion of the search query has changed. It should be noted that receiving a new query portion includes a user adding or deleting a character from the previous query portion. For instance, continuing the example in which the user intends to enter "computer" and has initially entered "c," a new query portion is received when the user adds an "o" to create the query portion "co." The user may then decide to delete the "o," causing a new query portion to be received as a result of the deletion. As noted above, the system may employ a number of approaches for monitoring changes to the query portion beyond explicit keystrokes, such as time-based approaches.

If a new query portion is received at block 412, the process of identifying suggested search queries and associated search results from block 404 through block 410 is repeated. Additionally, this method of refreshing the suggested search queries and associated suggested search results may continue until the user has completed inputting his/her search query.

At some point while the user is inputting the search query but before the user finishes, the user may recognize a suggested search result that is displayed with a suggested search query as a desired search result. Accordingly, the user may chose to select the suggested search result, and the selection of the suggested search result is received, as shown at block 414. In an embodiment, the selection can be received by the user selecting the suggested search result. The user may use, for example, a mouse, keyboard, touchscreen, joystick, or any other input device to select the search result. Based on the user selection, the website associated with the selected suggested search result is requested and presented to the user, as shown at block 416.

Figure 5:
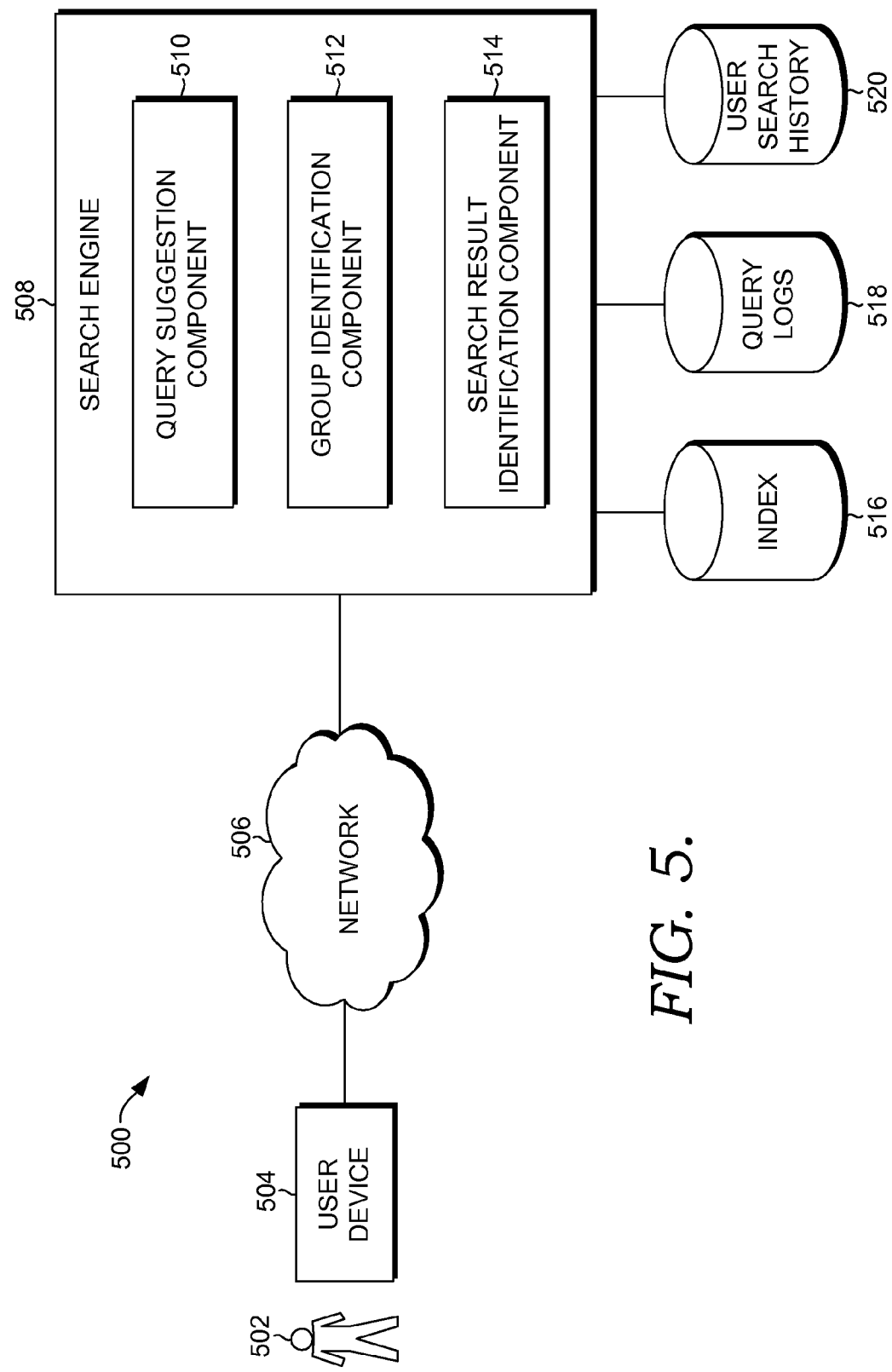
FIG. 5 is a block diagram of an exemplary system in which embodiments of the invention may be employed in which suggested search results are identified for suggested search queries based on the search history for a group of users associated with a user entering a search query.

As indicated previously, in another embodiment of the present invention, suggested search results to be associated with suggested search queries for a user are identified using search history from a group of users having some relationship to the user entering the search query. Turning to FIG. 5, a block diagram is provided that illustrates an embodiment of a system 500 in which suggested search results are provided with suggested search queries based on search history from a group of users associated with the user entering the search query. Similar to the system 200 of FIG. 2 and the system 300 of FIG. 3, the system 500 includes a user device 504 in communication with a search engine 508 via a network 506. A user 502 may generally employ the user device 504 to issue search queries to the search engine 508 and otherwise interact with the search engine 508.

In the embodiment of FIG. 5, the search engine 508 includes a group identification component 512, which is configured to identify a group of users associated with the user 502. The group identification component 512 may identify the group of users in a variety of different manners within the scope of embodiments of the present invention. In some embodiments, the user 502 may manually identify other users by providing some identifier to the search engine 508 that allows the search engine 508 to identify those users. In some embodiments, the group of users may be identified automatically based on sharing a common characteristic with the user entering the search query, such as, for instance, geographic location, gender, age, and interests.

In some embodiments, the group identification component 512 may identify the group of users as users in the same social network as the user 502. It should be noted that a single user can belong to one or more social networks and is not limited to being a member of only one social network in accordance with embodiments of the present invention. The group identification component 512 may identify the social networks automatically without any input from the user 502 or may identify the social networks based on information supplied by the user 502.

By way of example only and not limitation, the user 502 may belong to a social network via social network websites, which allow users to form connections with other users. Examples of social networking websites are FACEBOOK, MYSPACE, and FRIENDSTER, just to name a few. The connections between users can be formed to create social networks on such websites, for example, because of a shared common interest or activities between a group of users. Users can form connections between one another on both a group and individual basis. For instance, users can associate with one another on an individual basis by a first user issuing a request to a second user to list their status as "friends" or a functional equivalent thereof. When the second user consents to the request, a connection is formed between the first and second users. In effect, this connection is a social network with the first and second users being the only members. Users can form connections between each other on a group basis on such social networking websites as well. Users accomplish this by forming or joining "group" social networks within a social networking website. Specific "group" social networks can be created for a variety of specific interests. Users belonging to a "group" social network are therefore associated with one another. For instance, fans of a particular athletic team or club can form and join a social network for similarly situated individuals.

As additional examples, the user 502 may be identified as belonging to a social network based on the user's contacts. These contacts may be identified from a variety of different contact lists that the user 502 may maintain. For instance, the user 502 may maintain contacts in a personal information manager application, such as OUTLOOK. As another example, the user 502 may use an instant messenger, which maintains a "friend" or "buddy list" identifying other users the user 502 may contact using the instant messenger.

The search engine 508 also includes a query suggestion component 510, which is similar to the query suggestion component 210 of FIG. 2. The query suggestion component 510 is configured to receive query portions from the user device 504 and identify suggested search queries based on search queries previously submitted by the group of users identified by the group identification component 512. In particular, the user search history for users in the group of users is analyzed to identify past search queries from those users that are relevant for the query portion. In some embodiments, the query suggestion component 510 may also be configured to identify suggested search queries based on other sources of information, such as, for instance, information in the index 516 or the query logs 518. The suggested search queries are returned to the user device 504.

The search result identification component 514 identifies suggested search results based on the user search history for the group of users identified by the group identification component 512. In particular, the search result identification component 514 may identify the search histories in the user search history datastore 520 that correspond with the users identified as being within the group of users associated with the user 502. Additionally, the search result identification component 514 identifies search results, selected by those users, corresponding with the suggested search queries identified by the query suggestion component 510. The suggested search queries from the query suggestion component 510 and the suggested search results from the search result identification component 514 are presented to the user.

Figure 6:
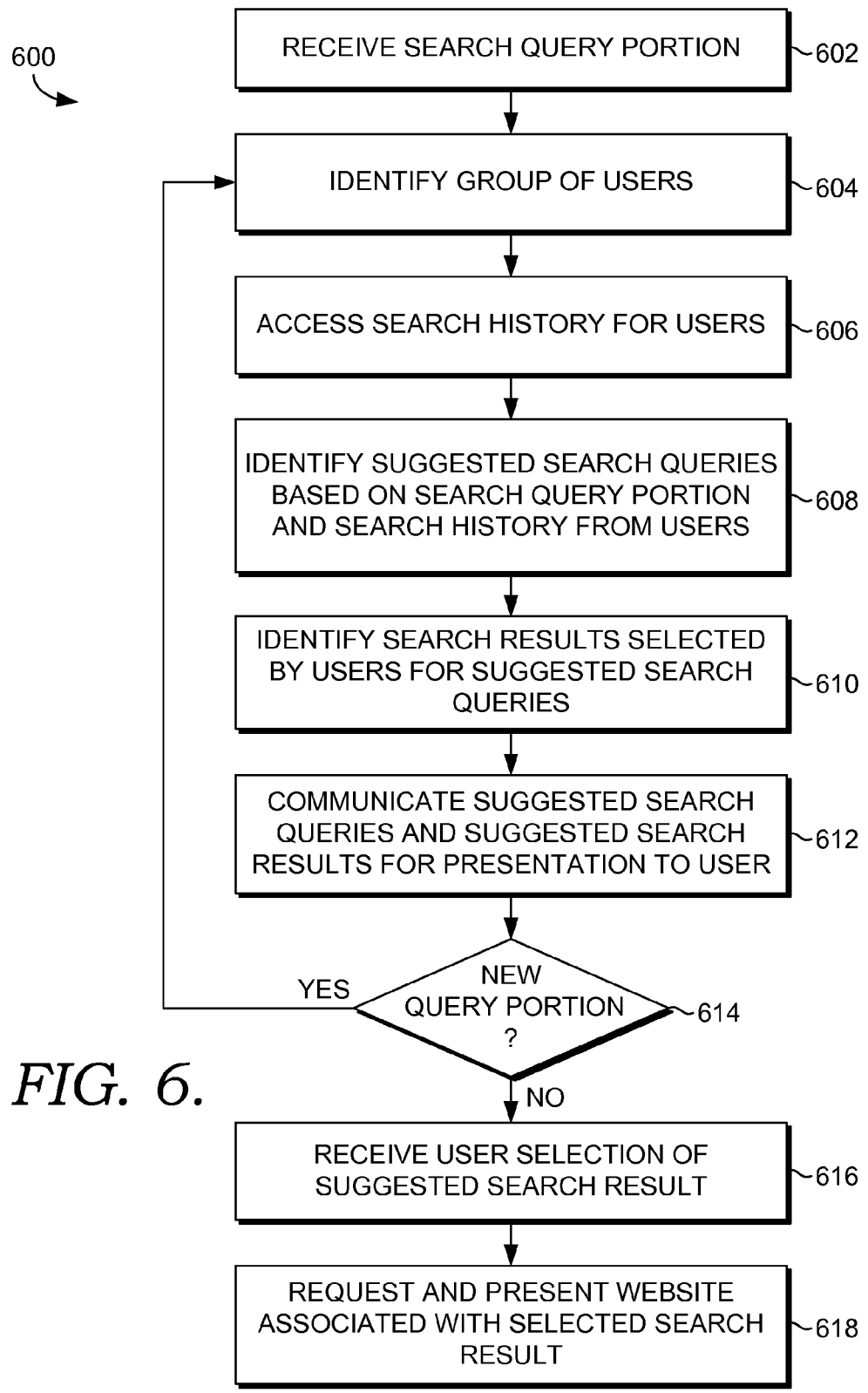
FIG. 6 is a flow diagram showing a method for identifying suggested search results for suggested search queries based on the search history for a group of users associated with a user entering a search query in accordance with an embodiment of the present invention.

With reference now to FIG. 6, a flow diagram is provided illustrating a method 600 for providing search results with suggested search queries based on user search history for a group of users associated with a user entering a search query in accordance with an embodiment of the present invention. As shown at block 602, a portion of a search query is initially received from a user. For instance, if the user intended to enter the search query "computer," the initial query portion received would be "c."

As shown at block 604, a group of users are identified as being associated with the user who entered the query portion. The search history for the users in the group of users is accessed at block 606. The search history for each user contains information including past search queries submitted by that user and search results that user selected for each search query. In some embodiments, to access each user's search history, each user is first identified and search history information corresponding with that user is identified.

Based on the received query portion, suggested search queries are identified, as shown at block 608. In embodiments, suggested search queries are determined by analyzing user search histories for users in the group of users to identify search queries previously submitted by those users that are relevant to the query portion. In some embodiments, suggested search queries may be identified from other sources, such as the search engine index or query logs. For instance, the suggested search queries may be identified by comparing the search query portion to search queries in query logs and/or information contained in a search engine's index. Identification of suggested search queries for the search query portion may include ranking various suggested search queries such that only the highest ranked suggested search queries are returned to the user. For instance, a suggested search query may be ranked based at least in part on the number or percentage of users within the group of users who have submitted the search query in the past.

Search results previously selected by the users in the group of users are identified as suggested search results, as shown at block 610. In particular, the search history for each user in the group of users is analyzed to identify search results that were selected by those users in response to suggested search queries from the users' search history. Those previously selected search results are associated with the suggested search queries as suggested search results.

In some embodiments, only search results meeting a predetermined threshold may be associated with the suggested search query and provided to the user as suggested search results. For instance, the predetermined threshold may be based on one or more of the following: the number of times the users within the group have selected the search result, how recently the users within the group have selected the search result, how long the users within the group viewed a web page associated with the search result, and how many or what percentage of the users within the group have selected the search result. Additionally, if multiple search results are associated with the suggested search query, a ranking algorithm may be employed to order the search results. The ranking algorithm may include one or more of the following as factors: the number of times the users within the group have selected the search result, how recently the users within the group have selected the search result, how long the users within the group viewed a web page associated with the search result, and how many or what percentage of the users within the group have selected the search result.

As shown at block 612, the identified suggested search queries and associated suggested search results are communicated for presentation to the user who entered the query portion. In some embodiments, the suggested search results are presented adjacent to the suggested search queries with which they correspond such that the user can readily identify the correlation between a suggested search result and its associated suggested search query. For instance, a first suggested search result associated with a first suggested search query may be shown adjacent to the first suggested search query, while a second suggested search result associated with a second suggested search query is shown adjacent to the second suggested search query. In some embodiments, the suggested search queries and suggested search results are presented in a common user interface that allows for selection of one of the suggested search queries or suggested search results. For instance, the suggested search queries and suggested search results may be presented in a drop-down box adjacent to the input box in which the user is entering the user's search query.

As discussed previously, embodiments of the present invention operate to provide suggested search queries and suggested search results while the user is entering a search query but before actually submits a completed search query. For instance, each time a user edits the query portion, suggested search queries and suggested search results may be provided. Accordingly, a determination is made at block 614 as to whether the portion of the search query has changed. It should be noted that receiving a new query portion includes a user adding or deleting a character from the previous query portion. For instance, using the example in which the user intends to enter "computer" and has initially entered "c," a new query portion is received when the user adds an "o" to create the query portion "co." The user may then decide to delete the "o," causing a new query portion to be received as a result of the deletion.

If a new query portion is received at block 614, the process of identifying suggested search queries and associated suggested search results from block 604 through block 612 is repeated. Additionally, this method of refreshing the suggested search queries and associated suggested search results may continue until the user has completed inputting his/her search query.

At some point while the user is inputting the search query but before the user finishes, the user may recognize a suggested search result that is displayed with a suggested search query as a desired search result. The suggested search result may include an embedded hyperlink that is selectable by the user. Accordingly, the user may chose to select the suggested search result, and the selection of the suggested search result is received, as shown at block 616. In an embodiment, the selection can be received by the user selecting the suggested search result. The user may use, for example, a mouse, keyboard, touchscreen, joystick, or any other input device to select the suggested search result. Based on the user selection, the website associated with the selected search result is requested and presented to the user, as shown at block 618.

Figure 7:
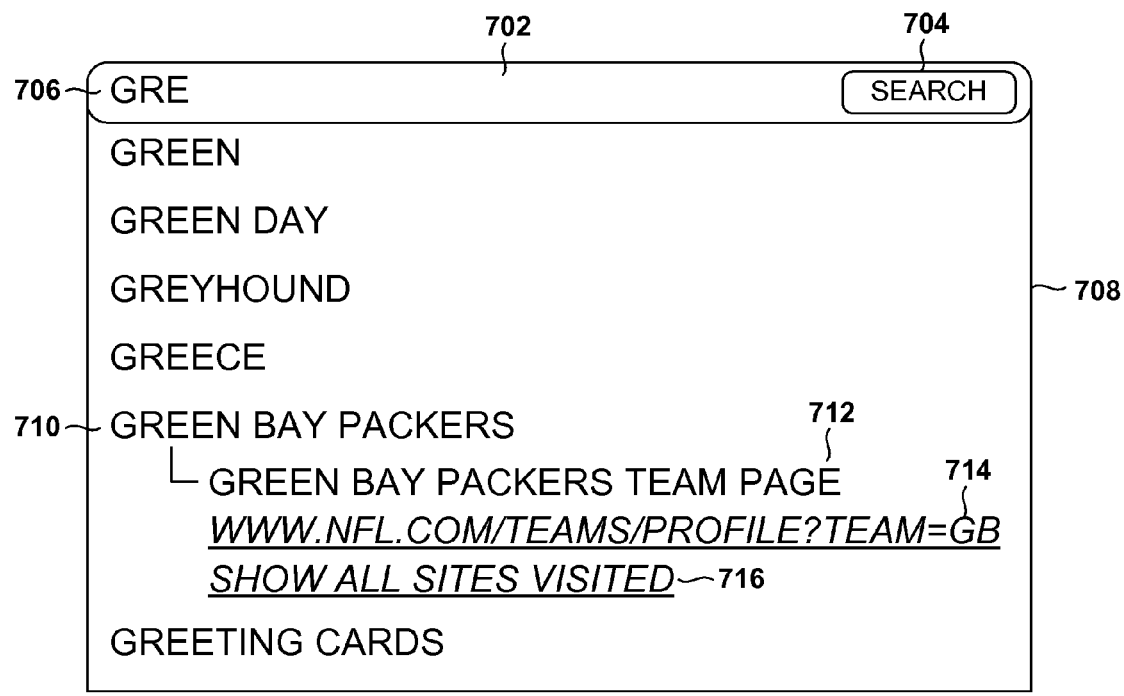
FIG. 7 is an illustrative screen display showing suggested search queries and an associated suggested search result that is presented as a user is entering a search query in accordance with an embodiment of the present invention.

Turning now to FIG. 7, an exemplary screen display portion is provided illustrating suggested search queries and an associated suggested search result being provided while a user is entering a search query portion in accordance with an embodiment of the present invention. It will be understood and appreciated by those of ordinary skill in the art that the screen display of FIG. 7 is provided by way of example only and is not intended to limit the scope of the present invention in any way.

As shown in FIG. 7, a search input box 702 is provided that allows a user to enter a search query. Additionally, a search button 704 is provided that allows the user to submit the search query to a search engine such that search results are returned in response to the search query. Suppose, for instance, that the present user is a Green Bay Packers fan and frequently visits a particular Green Bay Packers team page. Instead of bookmarking the page or remembering the URL for the team page, the user may have used a search engine to find the team page in the past. In the present example, the user has started typing a search query and has entered the query portion 706 "gre." Based on the query portion 706, a number of suggested search queries are provided in a dropdown box 708 (without requiring the user to select the search button 704). The suggested search queries include "green," "green day," "greyhound," "greece," "green bay packers," and "greeting cards." Each of the suggested search queries may be user selectable to cause a search to be performed using a selected suggested search query.

The "green bay packers" suggested search query 710 includes a suggested search result identified by a title 712 and a URL 714. In particular, the "green bay packers" suggested search query 710 is identified as matching search queries previously submitted by the user. Additionally, the Green Bay Packer Team Page 712 with corresponding URL 714 is identified as a search result the user has selected in response to "green bay packers" search queries the user has submitted in the past. The user may select the title 712 or URL 714 to view the desired web page. Alternatively, there may be additional search results the user has selected in the past for the search query and the user may select the "Show All Sites Visited" link 716 to view a list of those other search results.

As can be understood, embodiments of the present invention provide suggested search queries with associated suggested search results identified using a user's search history. Further embodiments of the present invention provide suggested search queries with associated suggested search results identified using search histories from users within a group of users associated with the user entering a search query.

The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. A computer-implemented method for providing suggested search queries and associated search results to a user, the method comprising:
   prior to receiving a user command to perform a search using a completed search query:
   receiving user input representing a search query portion;
   identifying a plurality of suggested search queries based on the search query portion;
   identifying a search result corresponding with a first suggested search query from the plurality of suggested search queries, the search result having been previously selected by the user multiple times in a plurality of previous search sessions, the multiple times satisfying a threshold number; and
   communicating the plurality of suggested search queries and the search result for presentation to the user, the plurality of suggested search queries being presented in a list with the search result being presented in the list adjacent to the first suggested search query to associate the search result with the first suggested search query.

2. The computer-implemented method of claim 1, wherein identifying the plurality of suggested search queries based on the search query portion comprises comparing the search query portion against query logs to identify at least one of the suggested search queries.

3. The computer-implemented method of claim 1, wherein identifying the plurality of suggested search queries based on the search query portion comprises comparing the search query portion against a search engine index to identify at least one of the suggested search queries, the search engine index storing information regarding web pages crawled by a search engine.

4. The computer-implemented method of claim 1, wherein identifying the plurality of suggested search queries based on the search query portion comprises comparing the search query portion against search history information for the user to identify at least one of the suggested search queries.

5. The computer-implemented method of claim 1, wherein the method further comprises ranking the plurality of suggested search queries.

6. The computer-implemented method of claim 1, wherein the search result is also identified based on the search result satisfying a predetermined threshold, wherein the predetermined threshold comprises at least one of: how recently the user has selected the search result, and how long the user viewed a web page associated with the search result.

7. The computer-implemented method of claim 1, wherein the method further comprises identifying a plurality of search results, and wherein the method further comprises ranking the plurality of search results based on at least one of: a number of times the user has selected each search result, how recently the user has selected each search result, and how long the user viewed a web page associated with each search result.

8. The computer-implemented method of claim 1, wherein the search result includes an embedded link, allowing for user selection of the search result causing a web page corresponding with the search result to be retrieved and displayed.

9. One or more computer-storage media storing computer-useable instructions for causing a computing device to perform a method for providing suggested search queries and suggested search results, the method comprising:
 as a user incrementally enters characters to form a portion of a search query, upon each increment:
 receiving the portion of the search query;
 accessing search history information for the user, the search history information including previous search queries submitted by the user and search results selected by the user for each of the previous search queries;
 identifying a suggested search query based on the portion of the search query and the search history information for the user, the suggested search query corresponding with a search query previously submitted by the user;
 identifying a suggested search result based on the suggested search query and the search history information for the user, the suggested search result corresponding with a search result previously selected by the user for the search query previously submitted by the user, the search result having been previously selected by the user a plurality of times when presented in response to searches using the search query previously submitted by the user in a plurality of previous search sessions, the plurality of times satisfying a threshold number; and
 communicating the suggested search query and the suggested search result for presentation to the user, wherein the suggested search result is presented adjacent to the suggested search query to associate the suggested search result with the suggested search query.

10. The one or more computer-storage media of claim 9, wherein the suggested search result includes an embedded link, allowing for user selection of the suggested search result causing a web page corresponding with the suggested search result to be retrieved and displayed.

11. One or more computer-storage media storing computer-useable instructions for causing a computing device to perform a method for providing suggested search queries and associated search results for a first user, the method comprising:
 prior to receiving a user command to perform a search using a completed search query:
 receiving user input from the first user, the user input representing a search query portion;
 identifying a plurality of suggested search queries based on the search query portion;
 identifying a search result corresponding with a first suggested search query from the plurality of suggested search queries, the search result having been previously selected a plurality of times in previous search sessions by at least one second user within a group of users associated with the first user, the group of users comprising users within a social network from a social networking website to which the first user belongs; and
 communicating the plurality of suggested search queries and the search result for presentation to the first user, the plurality of suggested search queries being presented in a list with the search result being presented adjacent to the first suggested search query to associate the search result with the first suggested search query.

12. The one or more computer-storage media of claim 11, wherein identifying the plurality of suggested search queries based on the search query portion comprises at least one of the following:
 comparing the search query portion against query logs to identify at least one of the suggested search queries;
 comparing the search query portion against a search engine index to identify at least one of the suggested search queries, the search engine index storing information regarding web pages crawled by a search engine; and
 comparing the search query portion against search history information for at least one of the first user and the at least one second user to identify at least one of the suggested search queries.

13. The one or more computer-storage media of claim 11, wherein the method further comprises ranking the plurality of suggested search queries.

14. The one or more computer-storage media of claim 11, wherein the method further comprises:
 identifying the at least one second user as being within the group of users associated with the first user; and
 accessing search history information for the at least one second user.

15. The one or more computer-storage media of claim 11, wherein identifying the search result corresponding with the first suggested search query comprises determining that the search result satisfies a predetermined threshold.

16. The one or more computer-storage media of claim 15, wherein the predetermined threshold comprises at least one of: a number of times the at least one second user has selected the at least one search result, how recently the at least one second user has selected the at least one search result, and how long the at least one second user viewed a web page associated with the at least one search result.

* * * * *